US006783185B1

(12) United States Patent
Sutton et al.

(10) Patent No.: US 6,783,185 B1
(45) Date of Patent: Aug. 31, 2004

(54) BIB FOR ATTACHMENT TO A SEAT BELT (76) Inventors: Eugene Sutton, 3709 17th St. West, Lehigh Acres, FL (US) 33971; Irwin Silberman, 10 Crestview Ter., Monsey, NY (US) 10952

(*) Notice: Subject to any disclaimer, the term of this patent is extended or adjusted under 35 U.S.C. 154(b) by 420 days.

(21) Appl. No.: 09/689,556

(22) Filed: Oct. 12, 2000

Related U.S. Application Data (60) Provisional application No. 60/203,364, filed on May 10, 2000.

(51) Int. Cl.$^7$ ................................................ B60R 22/00
(52) U.S. Cl. ...................... 297/482; 280/801.1; 2/49.2
(58) Field of Search ............................ 297/482; 2/49.1, 2/49.2; 280/801.1

(56) References Cited

U.S. PATENT DOCUMENTS

| 4,953,816 | A | * | 9/1990 | Wilkinson | 248/102 |
| 5,379,725 | A | * | 1/1995 | Roberson et al. | 119/770 |
| 5,960,472 | A | * | 10/1999 | Reid | 2/48 X |
| 6,017,094 | A | * | 1/2000 | Syiek | 297/482 X |
| 6,322,149 | B1 | * | 11/2001 | Conforti et al. | 297/482 |
| 6,394,554 | B1 | * | 5/2002 | Hingle | 297/482 X |

* cited by examiner

Primary Examiner—Anthony D. Barfield (57) ABSTRACT

A bib and method for constructing a bib designed for attachment to a vehicular seat belt is disclosed. The embodiments disclosed and illustrated protect the clothing of a driver or passenger of a motorized vehicle from any spilled food and/or beverage while in a vehicle.

2 Claims, 16 Drawing Sheets

BIB FOR ATTACHMENT TO A SEAT BELT

This application claims the benefit of the filing of co-pending U.S. provisional application Serial No. 60/203,364, filed May 10, 2000 and which is incorporated by reference herein in its entirety.

The present invention is directed to a bib that a driver or passenger of a motor vehicle can attached to a seat belt and conveniently wear without interfering with the operation of the seat belt and which can effectively catch any food or beverage spills that occur, thereby protecting the clothing from unsightly food and beverage stains.

DESCRIPTION OF THE INVENTION

Figure 2:
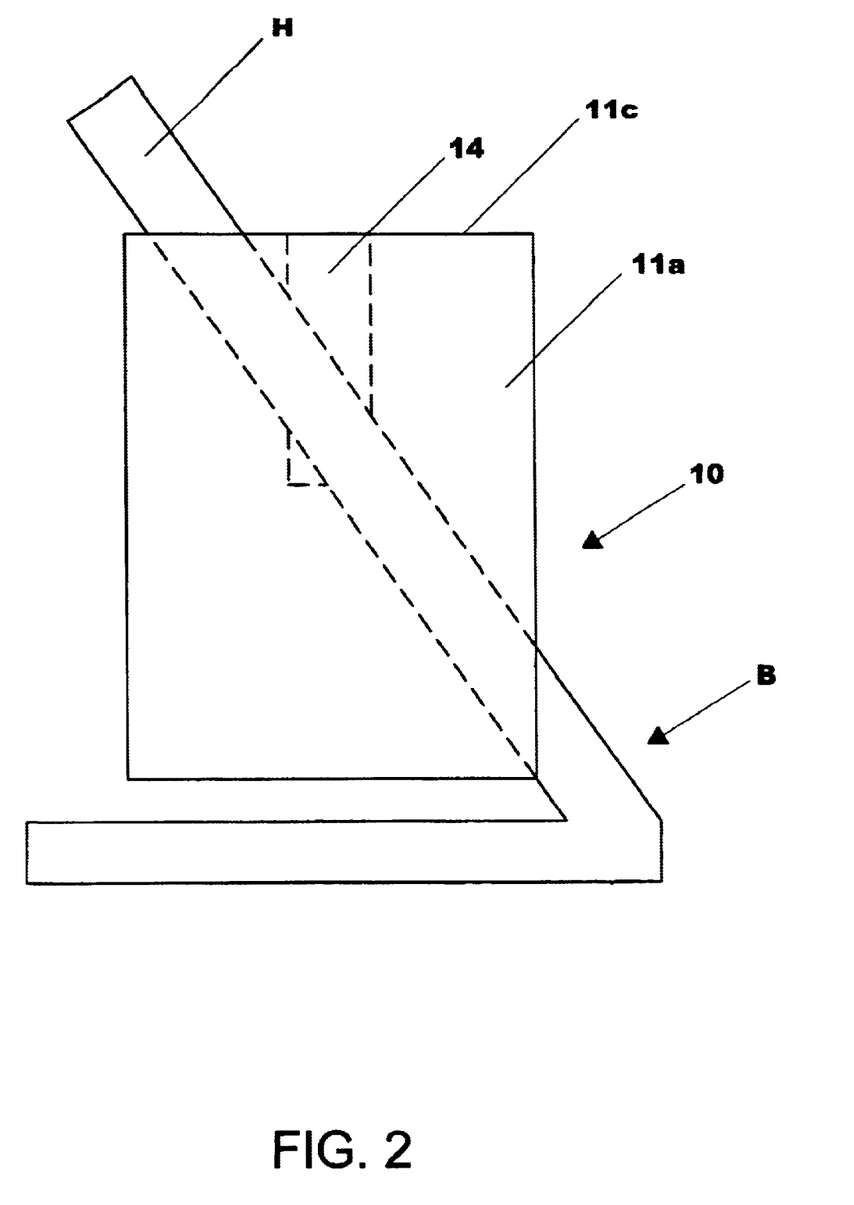
FIG. 2 is a front view of one embodiment of the inventive bib attached to a vehicular seat belt.
Figure 3:
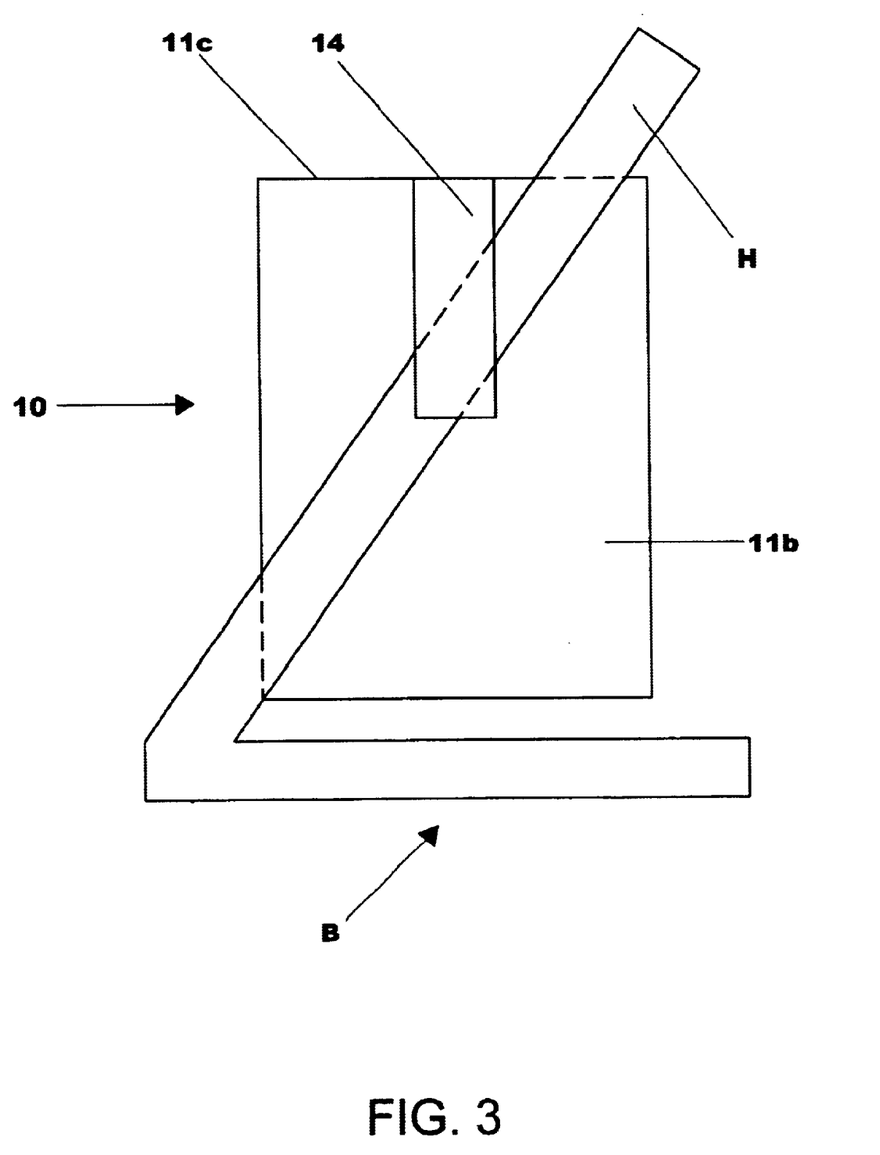
FIG. 3 is a rear view of the embodiment illustrated in FIG. 2.
Figure 4:
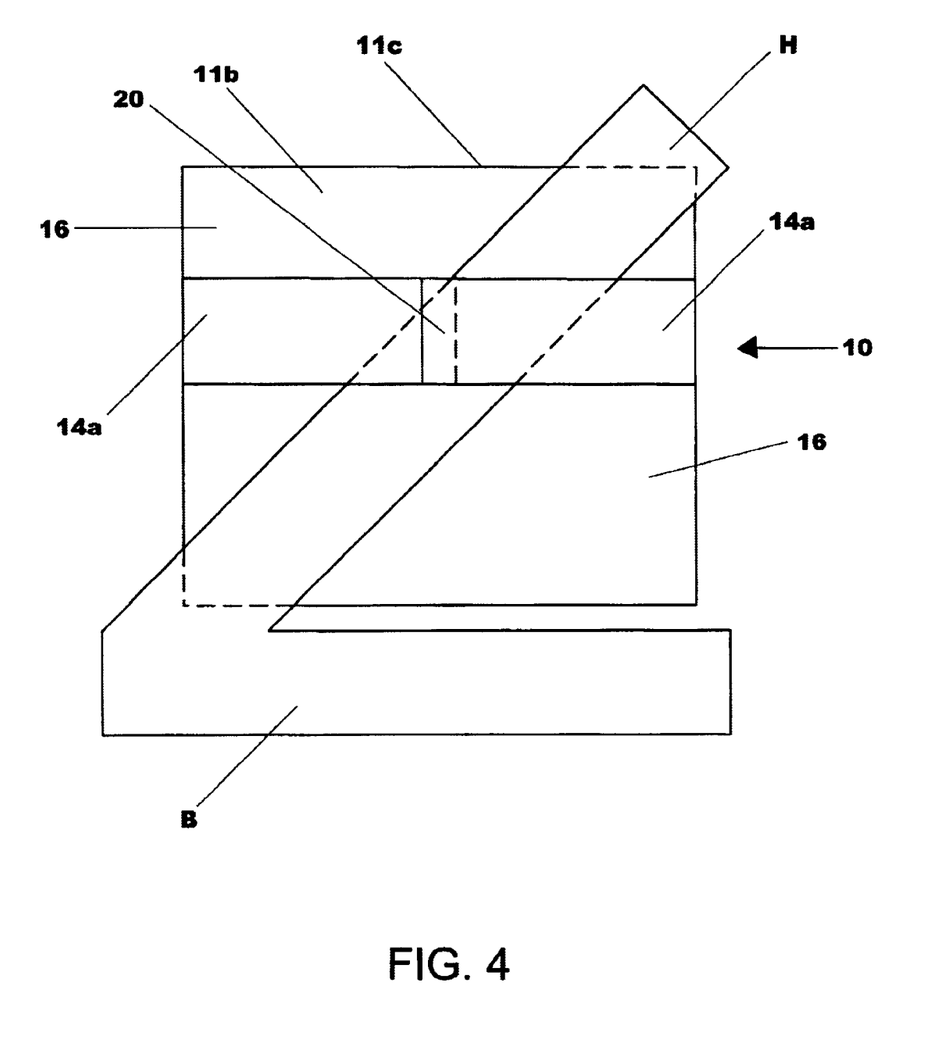
FIG. 4 is a rear view of a second embodiment of the inventive bib.
Figure 6:
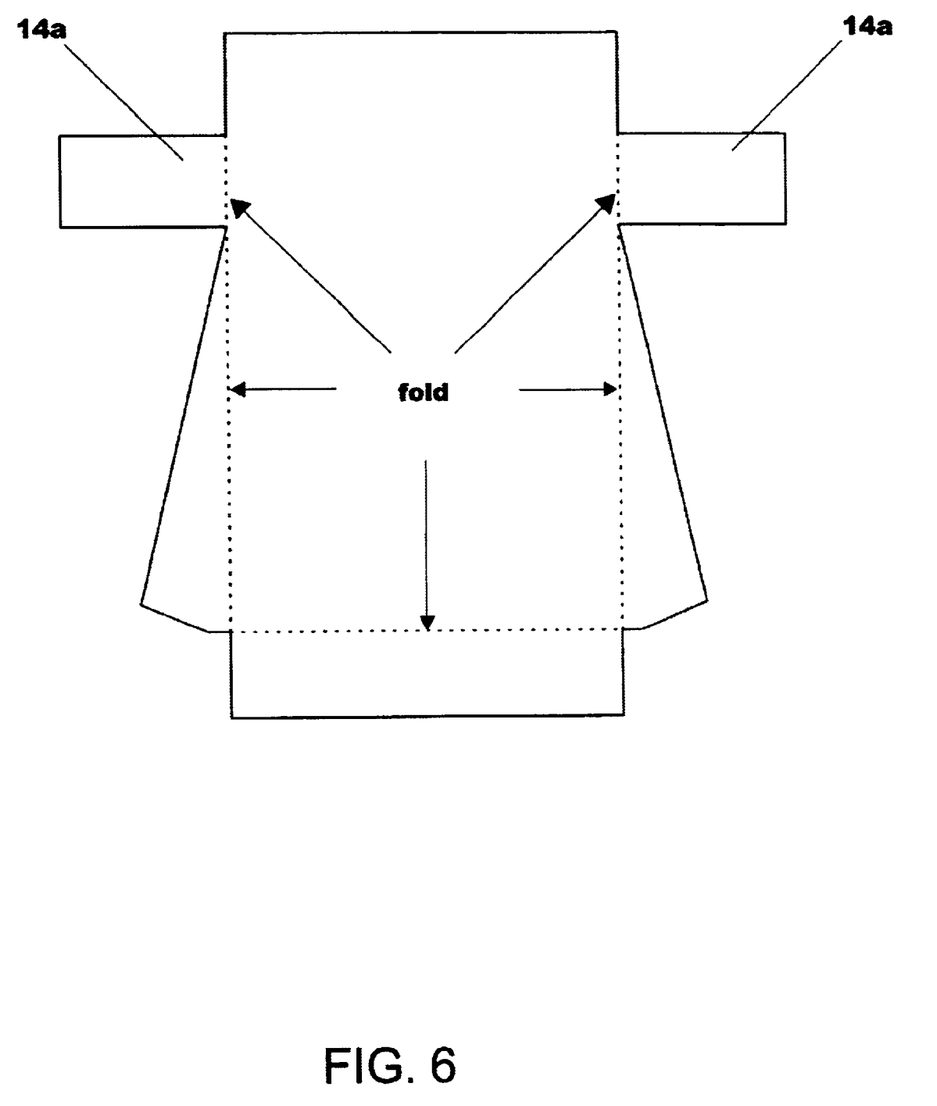
FIG. 6 is an exemplary pattern for constructing the embodiment shown in FIG. 4.

The present invention is directed to a protective bib designed for, attachment to vehicular passenger seat belt systems. The seat belt system may be any conventional vehicular passenger restraining system found in any motorized vehicle, including, but not limited to, automobiles, vans, recreational vehicles, trucks, buses, marine craft, and the like. Referring now to the figures, the present invention, in certain embodiments, comprises a bib (10) having a front protective portion (11). The front protective portion (11) has a visible outer surface (11a) for contacting any spilled food/beverage and an inner surface (11b) adapted to align against the wearer's chest. The outer surface may have printed thereon illustration(s) and/or text. As used herein, "wearer" means the driver and/or passenger(s) of the vehicle. In the embodiment illustrated in FIGS. 1–3, a flap (14) is secured to the front protective portion of the bib, preferably near or integral with the top edge (11c) of the front protective portion. The flap (14) should be long enough to insert behind the shoulder harness portion (H) of a conventional vehicular seat belt (B). Once the wearer (not shown) is seated within the vehicle and fastened therein by the seat belt, the bib (10) may be secured to the seat belt by sliding the flap (14) behind the shoulder harness portion such that the flap (14) is disposed between the inner surface of the front protective portion (11) and the shoulder harness portion (H). FIGS. 2 and 3 are front and rear views, respectively, of this embodiment of the bib (10) secured to the shoulder harness (H) of the seat belt (B). FIG. 4 illustrates another embodiment of the present invention wherein instead of incorporating only one flap, the bib employs two side flaps (14a) secured to the rear sides (16) of the front protective portion (11) (FIGS. 4,6). The two side flaps (14a) can then be fastened around the seat belt by any conventional fastener (20), including, but not limited to, snaps, VELCRO, buttons, and the like. As discussed in more detail below, an adhesive may be placed on one or both ends of the side flap (14a) for adhesively affixing the two flaps together to securely maintain the bib to the shoulder harness portion.

Figure 9:
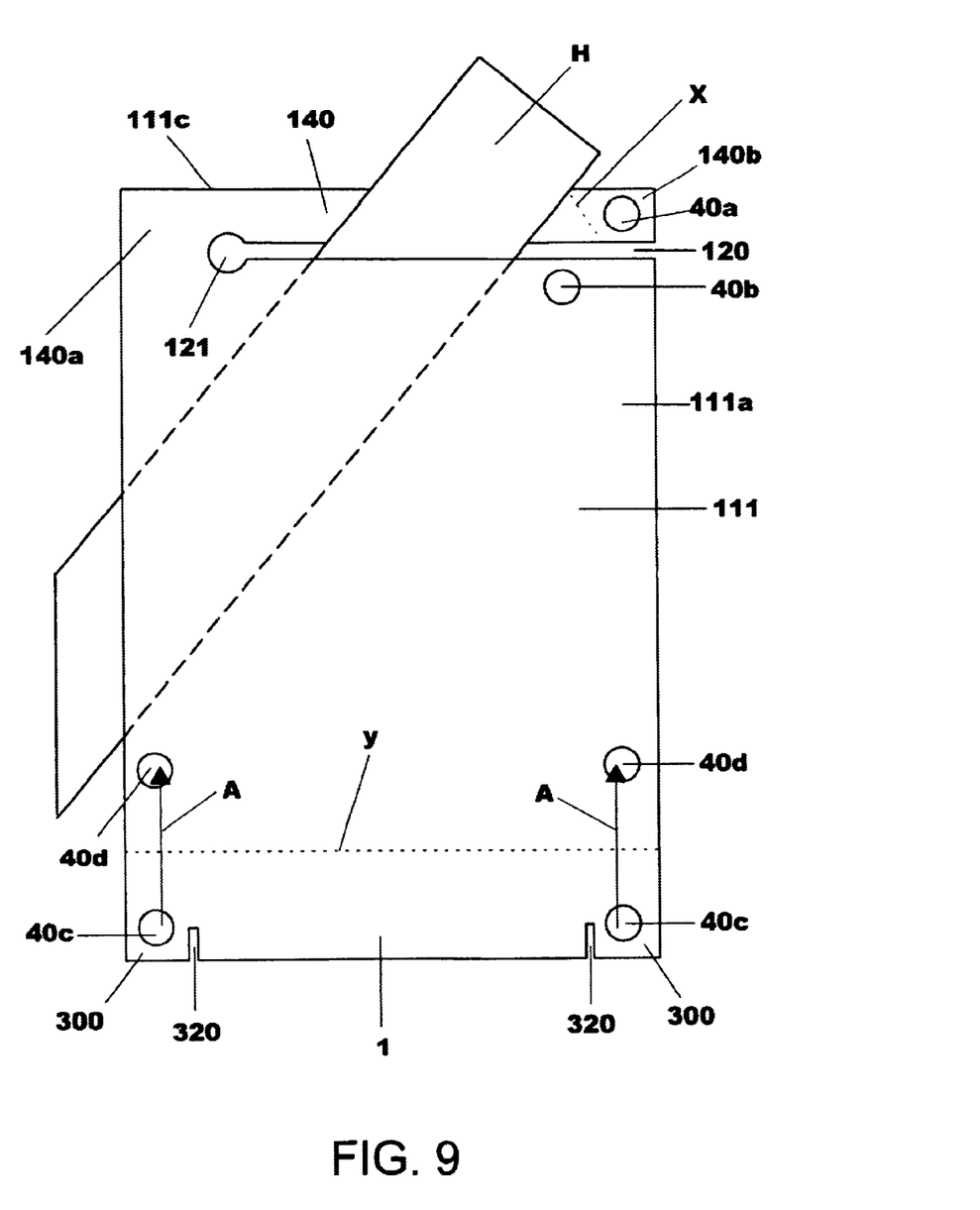
FIG. 9 is a front view of a fifth embodiment of the present invention.

FIG. 9 illustrates another embodiment of the present invention wherein the front protective portion comprises a horizontal slit (120) disposed near the top edge (111c) to form a horizontal flap (140), the flap (140) thus comprising one fixed end (140a) integral with one side of the front protective portion as shown and a second free end (140b) opposite therefrom. In this embodiment, the shoulder harness portion (H) slides into the slit (120) such that a segment of the shoulder harness is disposed between the flap (140) and the inner surface of the front protective portion. Optionally, the bib in this embodiment may be provided with an adhesive (40a) placed on the free end (140b) of the flap (140), as shown. An adhesive (40b) may also be placed directly on the outer or inner surfaces of the front protective portion, as shown, such that once the shoulder harness portion is placed within the slit (120), a portion of the flap upon which the adhesive is disposed is folded down along line X to contact the adhesive (40a) of the flap to the adhesive (40b) disposed on the outer (or inner) surface of the front protective portion, thereby more securely engaging the bib to the shoulder harness portion (H). Alternatively, the adhesive may be disposed on the flap only or just below the flap on the front protective portion.

As used herein, "adhesive" means any substance that has adhesive properties. If the bib is designed for multiple uses, the adhesive employed should be one that allows for multiple attachments, and thus, not result in a permanent adhesion. Exemplary adhesives for use in the present invention include, but are not limited to, coadhesives and glue. Coadhesives, as those of ordinary skill in the art are well aware, have the unique property of adhering to like coadhesives without adhering to other substances or materials. Thus, in FIG. 9, for example, a coadhesive may be applied at 40a and 40b such that when the flap (140) is folded at line X, the coadhesive (40a) will adhere to coadhesive (40b). However, if several bibs of the design shown in FIG. 9, for example, are stacked on top of each other for storage or future shipping, the bibs will not stick to one another via the coadhesives.

While the use of an adhesive is a preferred attachment mechanism for further securing the exemplary flaps of the inventive bib embodiments described herein, it will be appreciated by those of ordinary skill in the art that mechanical fasteners may be employed, instead. Exemplary fasteners include, but are not limited to, snaps, buttons, VELCRO, buckles, and the like.

Figure 10:
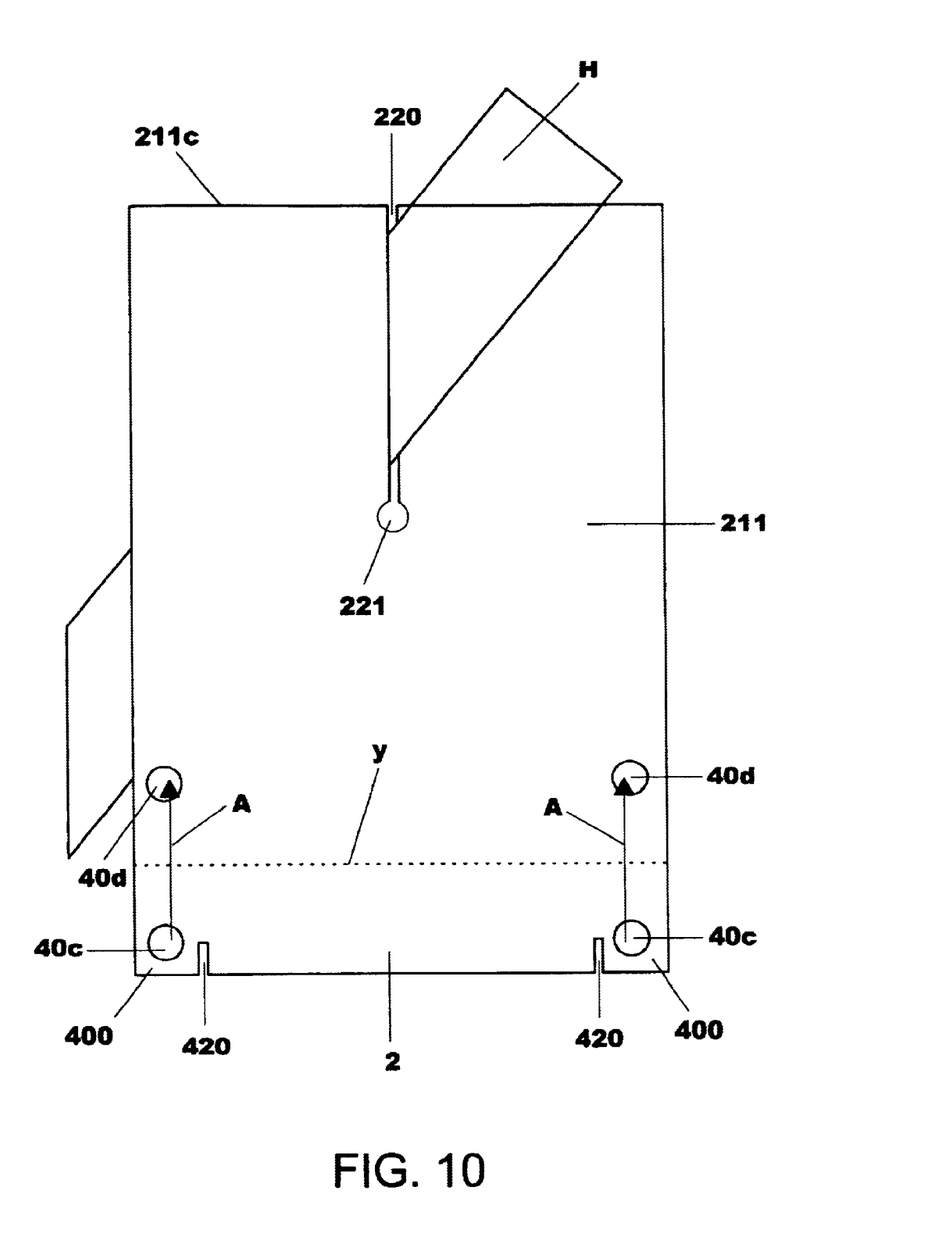
FIG. 10 is a front view of a sixth embodiment of the present invention.

FIG. 10 illustrates another embodiment wherein the front protective portion (211) has a centrally disposed vertical slit (220) extending downward through the top edge (211c) of the front protective portion of the bib, as shown. Here, a segment of the shoulder harness may be slid into the slit (220) and maintained thereon. In both embodiments of the bib as illustrated in FIGS. 9–10, wherein the bib incorporates either a horizontal or vertical slit to form the flap, it is preferred that the slit (120, 220) terminate into a larger opening (121, 221) disposed through the front protective portion. As shown, the opening (121, 221) has a larger width than the slit, thereby preventing the slit from elongating and thus tearing through the front protective portion. In the embodiment shown in FIG. 9, for example, provision of this terminal opening (121) prevents the flap (140) from tearing off completely.

Figure 1:
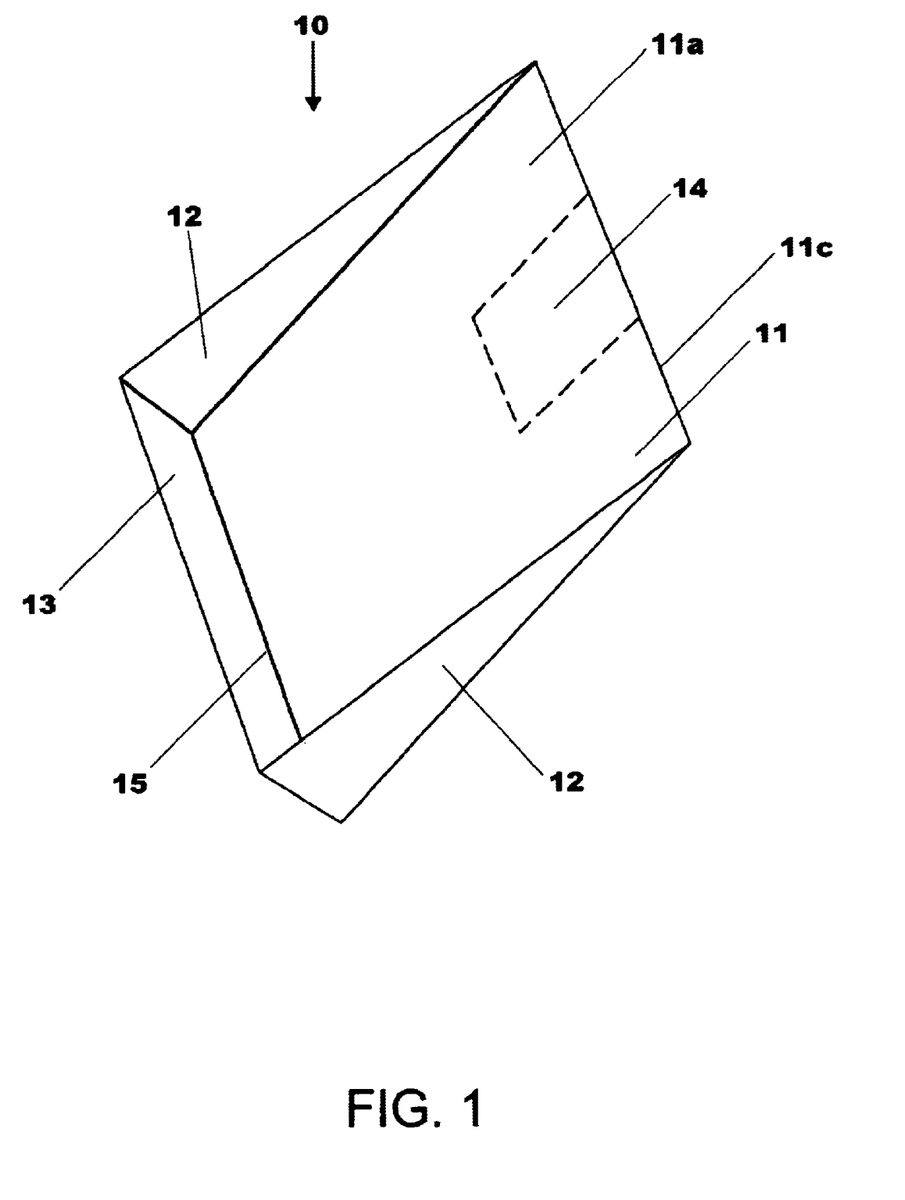
FIG. 1 is a perspective view of one embodiment of the inventive bib.

The bib (10) may further include, in certain embodiments, side portions (12) and a bottom (13) portion that, in combination, form a reservoir (15), as shown in FIG. 1. The reservoir (15) functions to catch any food particles or beverage spills, thereby preventing the food/beverage from dropping onto the wearer's lap. These features of the bib (i.e. the side portions (12), bottom (13), and resulting reservoir (15) are optional and if desired, may be eliminated altogether, as shown in FIG. 2, for example.

FIGS. 9–10 further illustrate another means for forming a reservoir. This means can also be employed in the embodiments illustrated in FIGS. 1–4. Here, the front protective portion (111, 211) of the bib may be folded upward along dotted line (Y). Disposed near the two lower corners of the front protective portion of the bib is an adhesive (40c). When the lower portion (1,2) of the front protective portion is folded upward in the direction of arrows A, the adhesive (40c) is affixed to the outer surface of the front protective portion, thereby creating a reservoir (not shown). As shown in FIGS. 9–10, a small slit (320, 420) may be provided in each lower corner to create a tab (300, 400). When the lower portion (1,2) is folded upward along line Y, the tab is adhered to the outer surface of the front protective portion via the adhesive (40c). Preferably, an adhesive (40c) is disposed on the outer surface of the front protective portion near each side edge and in registration with the adhesive (40c) on the tab (300, 400), such that when the lower portion is folded upward along line Y, the adhesive (40c) of the tab (300, 400) contacts the corresponding adhesive (40d) on the outer surface, thereby creating the reservoir.

Figure 11A:
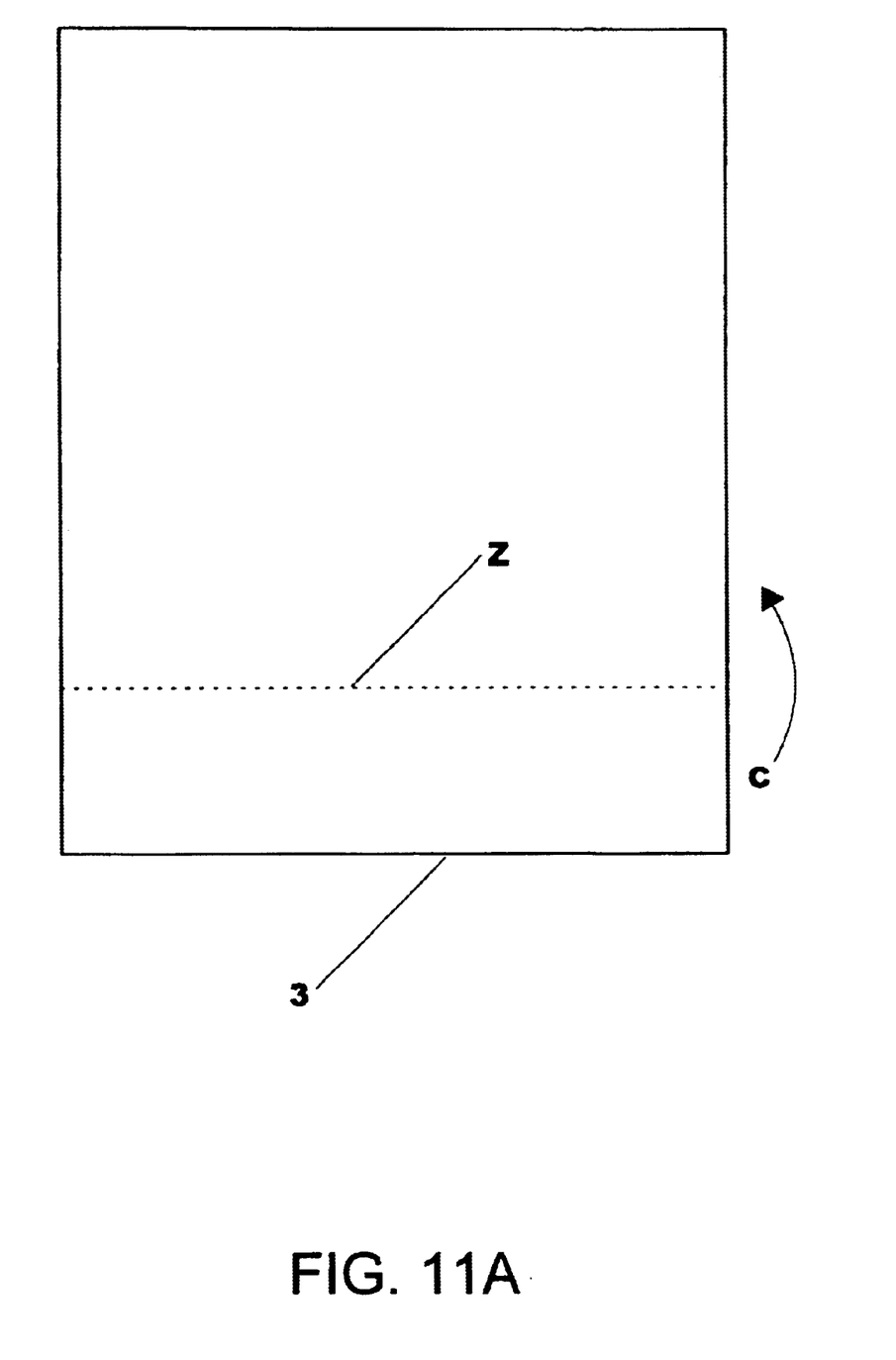
FIGS. 11A–11C illustrate an alternate method of forming a reservoir.
Figure 11B:
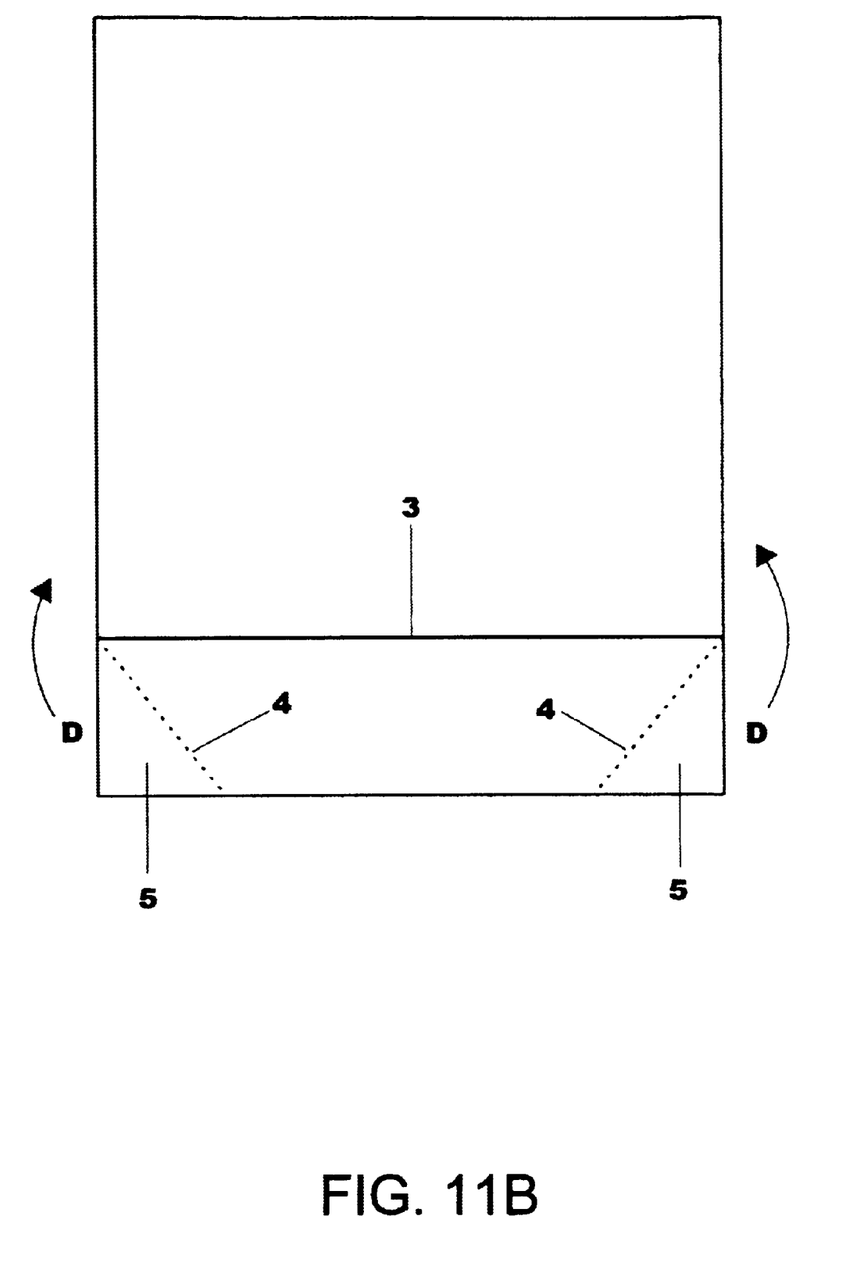
Figure 11C:
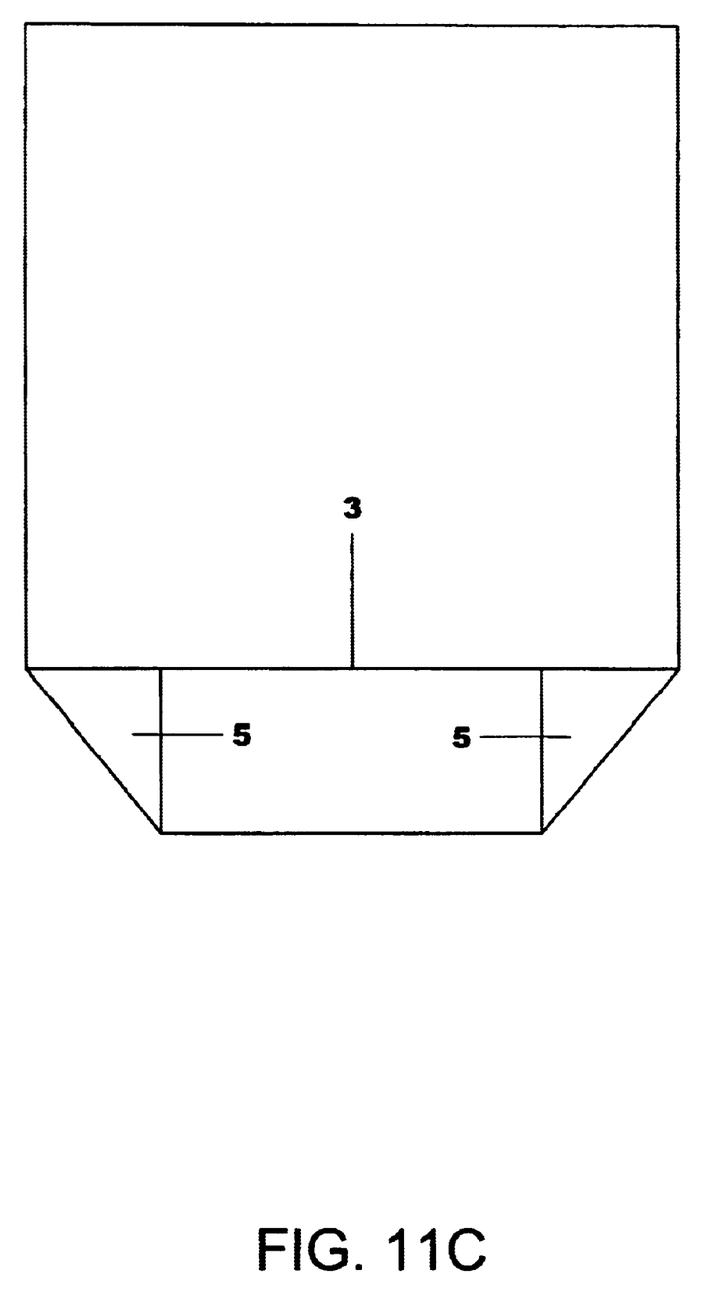

FIGS. 11A–11C illustrate another means for forming a reservoir. This means can be employed in the embodiments illustrated in the other figures, as well. The lower portion of the front protective portion may be folded along line Z in the direction of arrow C, as shown in FIG. 11A such that the edge (3) is approximately flush with line Z. As shown in FIGS. 11B–11C, the lower corners (5) of the front protective portion may be folded in the direction of arrow D along line (4). The corners (5) may optionally be mechanically or adhesively affixed to the front protective portion.

Figure 12A:
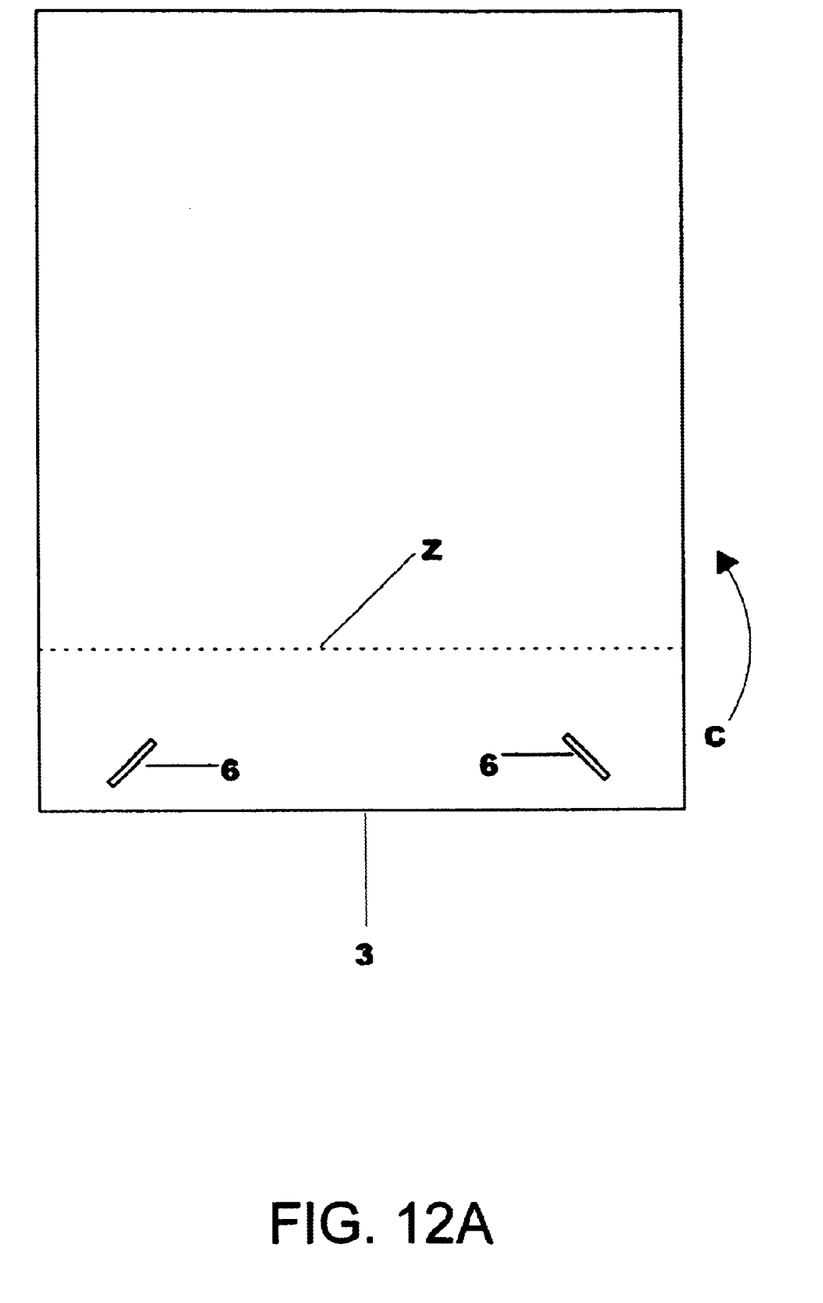
FIGS. 12A–12C illustrate an alternate method of forming a reservoir.
Figure 12B:
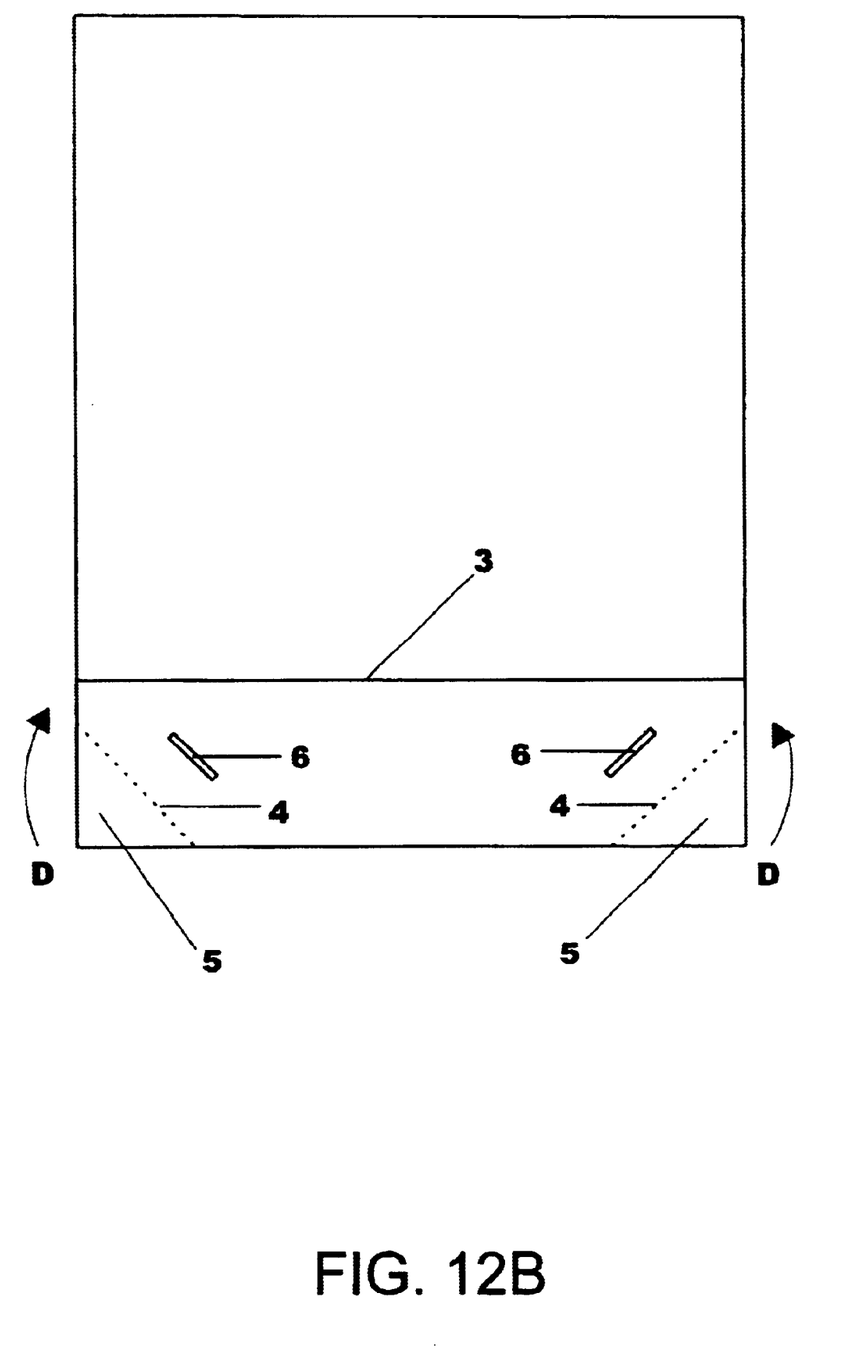
Figure 12C:
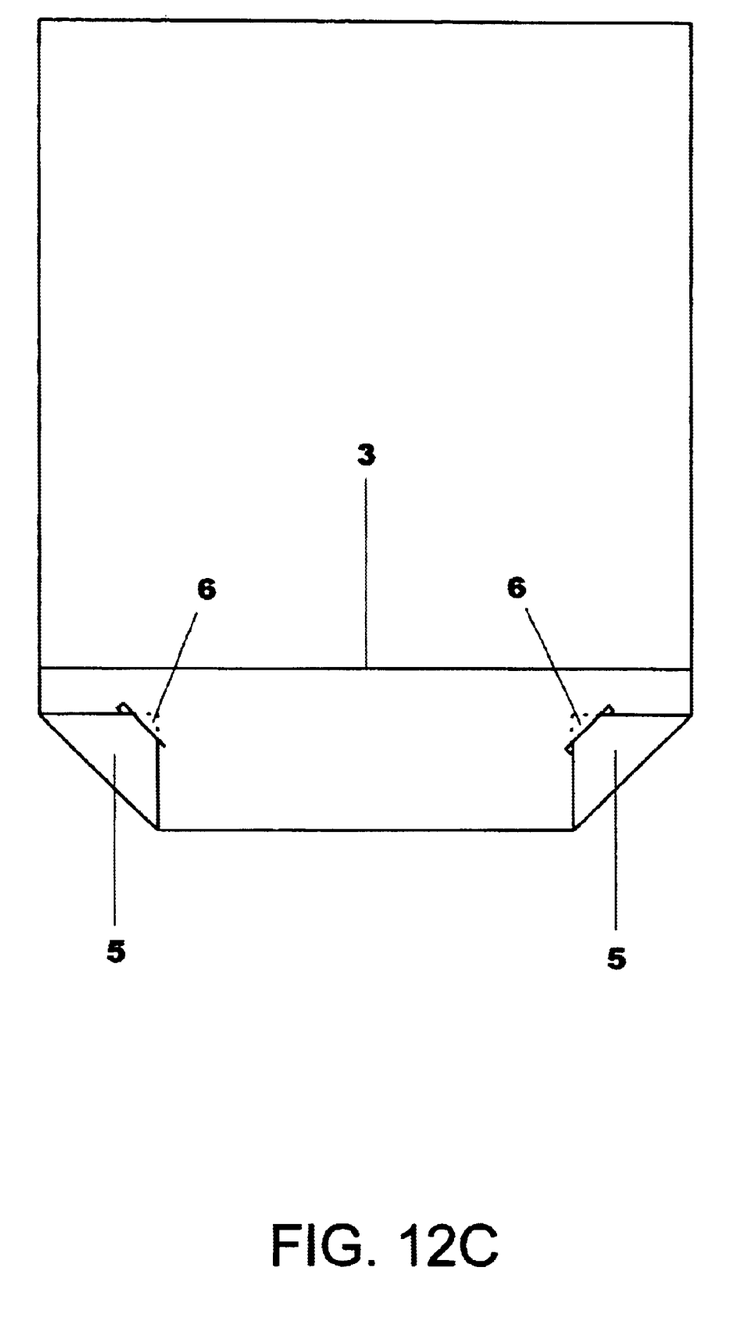

FIGS. 12A–12C illustrate a means for forming a reservoir similar to that shown in FIGS. 11A–11C. Similarly, this means can be employed in the embodiments illustrated in the other figures, as well. Here, the lower portion of the front protective portion includes a pair of slits (6). As discussed above, the lower portion is folded in the direction of arrow C, as shown in FIG. 12A, such that the lower edge (3) is approximately flush with line Z. The lower corners (5) are then folded along line (4) in the direction of arrow D, as shown in FIG. 12B. Finally, each corner (5) is tucked into its respective slit (6) and maintained therein, as shown in FIG. 12C.

Figure 5:
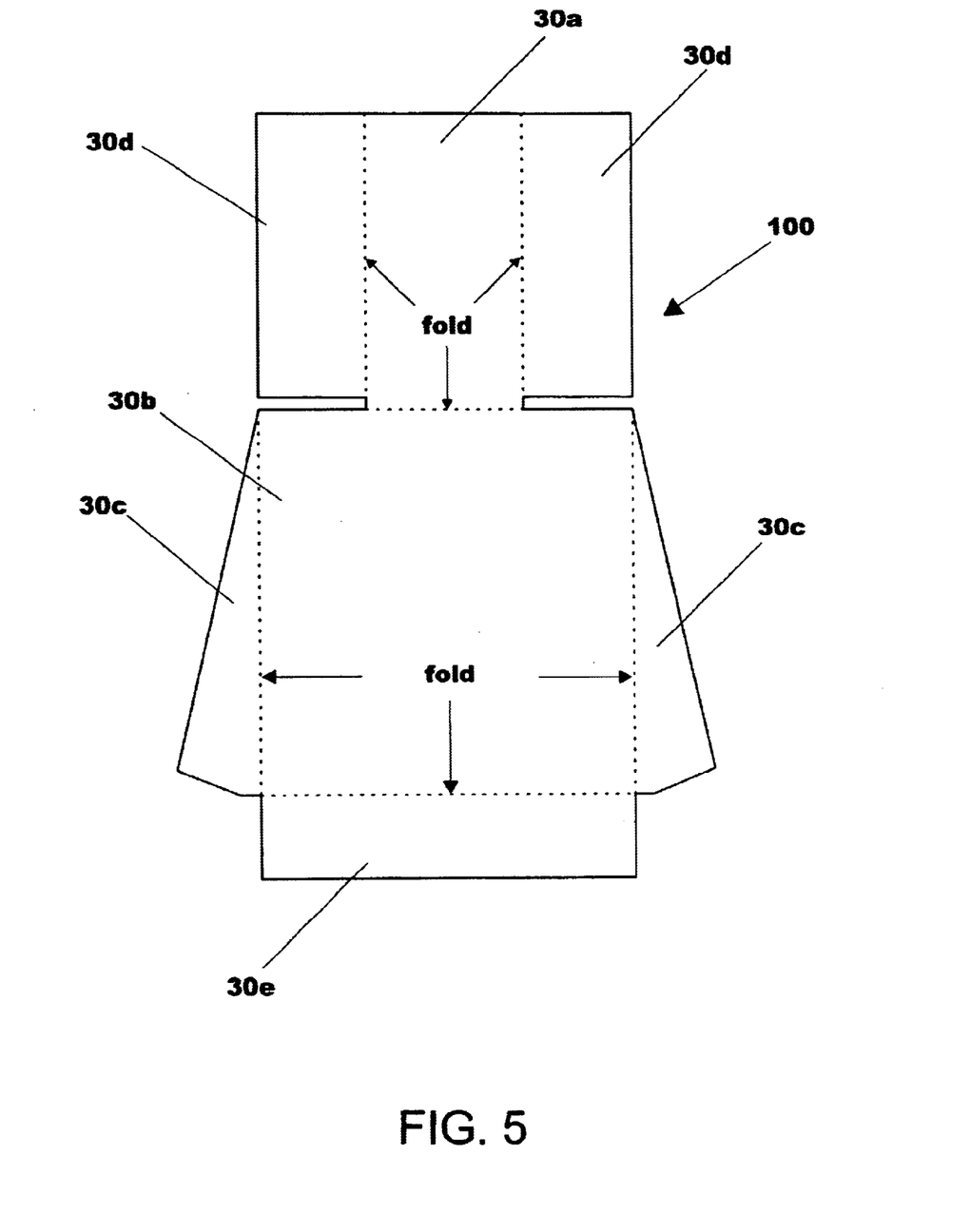
FIG. 5 an exemplary pattern for constructing an embodiment of the inventive bib.
Figure 7:
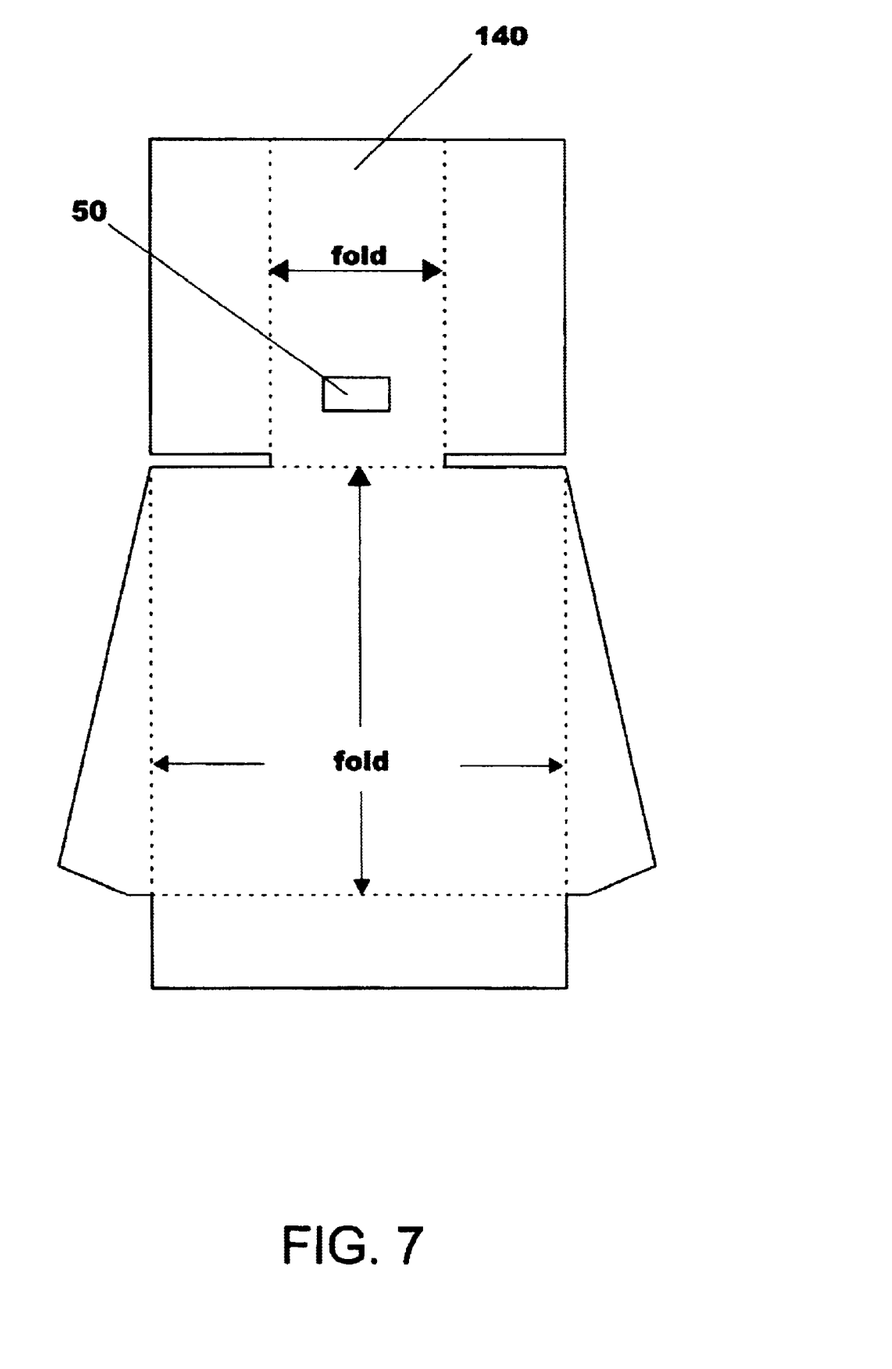
FIGS. 7–8 are exemplary patterns for constructing third and fourth embodiments of the inventive bib.
Figure 8:
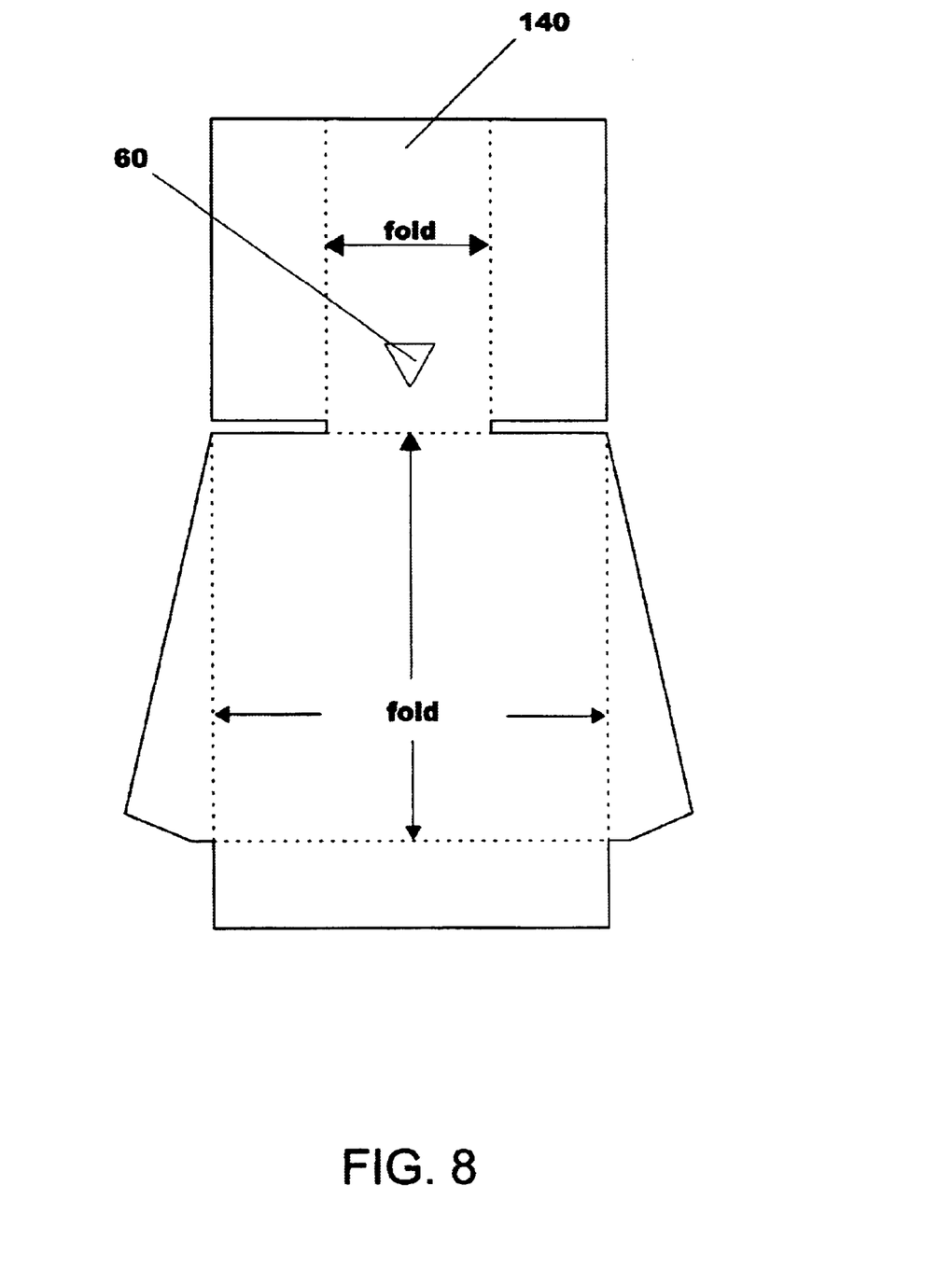

The bib (10) may be fabricated from a variety of materials, including but not limited to, paper, fabric (cotton, polyester, cotton/polyester blend), plastic, etc. The bib (10) may further be disposable for single use or constructed of the appropriate material so that it may be laundered for multiple uses. Moreover, as shown in FIG. 5, the bib may be manufactured such that the end user constructs the final product by following product's directions for folding and affixing the various sections (30a–30e) of the bib pattern (100) to construct the final bib product (10) (FIG. 1). Cuts, folds, and optional adhesive attachment of sections shown in FIG. 5 as well as FIGS. 6–8 form the flap (30a), side portions (30c), bottom portion (30e), and front protection portion (30b) of the final bib product. FIG. 6 illustrates an exemplary pattern for constructing the bib shown in FIG. 4 and discussed above. FIGS. 7–8 illustrate exemplary patterns for constructing other embodiments of the inventive bib, wherein the flap (140) comprises an additional fastener, such as a VELCRO tab (50) for attachment to a complementary loop portion (not shown) secured to the shoulder harness portion (H) or a button hole (60) for engagement with a button (not shown) of the wearer's shirt, blouse, dress, or coat/jacket.

It will be recognized and appreciated by those of ordinary skill in the art that folding lines (X, Y, Z, 3, and 4) described and illustrated herein may be visible to aid in constructing and/or using the bib. Alternatively, these lines may be imaginary and thus considered in phantom in the figures, thereby illustrating approximate areas where portions of the bib should be folded to form the reservoir and/or to secure the flap (120).

It will be further recognized and appreciated by those of ordinary skill in the art that the inventive bib may be of any number of sizes. FIGS. 5–8, for example, illustrate exemplary dimensions for adult use, although smaller bibs may be designed for use by children. It will also be appreciated that the flaps of all of the inventive bib embodiments may be secured to the shoulder straps of infant car carriers and toddler car seats.

The foregoing disclosure and description of the invention are illustrative and explanatory thereof, and various changes in the size, shape, and materials, as well as in the details of the illustrated construction may be made without departing from the spirit of the invention even though such variations were not specifically discussed above. For example, while use of the flap and slits, as described and illustrated herein, are preferred due in part to their simplicity, it will be recognized by those of ordinary skill in the art that other devices for attaching the bib to the shoulder harness may be employed.

The drawing FIGS. 2,3,4,5, and 7 clearly show that the attachment to another shoulder harness, such as on a passenger side of a vehicle is equally applicable. It is a well known fact shoulder harnesses are operating in a reverse diagonal direction with respect to a driver of a vehicle or a passenger of a vehicle. Since the shoulder belts run from the door posts of a vehicle, the diagonal direction of the passenger shoulder belt is reversed from that of the driver. FIGS. 2 and 3 somewhat simulate such a reversal. The bibs disclosed in the above noted Figs. can easily follow this reversal although in FIG. 3 a rear view is shown. If the showing in FIG. 3 is a passenger harness, the bib 10 can easily be applied as is shown in FIG. 2. This then increases the versatility of the bibs as disclosed. At times the front surface of the bib may have to be reversed to expose the rear side as a protection against spillage of food or drink

What is claimed is:

1. A method of protecting a person's clothing from spilled food and beverages while driving or riding in a motorized vehicle, said method comprising:

attaching a bib to a shoulder harness portion of a vehicular seat belt system said bib comprising: a front protective portion having an outer surface and an inner surface whereby, when said bib is secured to said shoulder harness portion, said inner surface is aligned against said person's clothing and wherein, either before or after attaching said bib to said shoulder harness portion, creating a reservoir to trap any spilled food or beverage, wherein said step of creating of said reservoir includes the step of folding upward a lower portion of said front protective portion and adhering each lower corner of said front protective portion to said outer surface.

2. A method of protecting a person's clothing from spilled food and beverages while driving or riding in a motorized vehicle, said method comprising: attaching a bib to a shoulder harness portion of a vehicular seat belt system, said bib comprising: front protective portion having an outer surface and an inner surface, whereby, when said bib is secured to said shoulder harness portion, said inner surface is aligned against said person's clothing, said bib further comprising a flap disposed near, or integral with, said top edge of said front portion and is adapted to slide behind said shoulder strap portion such that said shoulder strap portion is disposed between said inner surface of said front protective portion and said flap, and wherein, either before or after said step of attaching said bib to said seat belt system, a step of creating a reservoir on said bib is included to trap any spilled food or beverage, wherein said step of creating said reservoir includes the step of folding upward a lower portion of said front protective portion and adhering each lower corner of said front protective portion to said outer surface.

* * * * *